Patented June 30, 1925.

1,544,048

UNITED STATES PATENT OFFICE.

HARRY HOWARD STOUT, OF DOUGLAS, ARIZONA.

TREATMENT OF COPPER METALLURGICAL SLAG.

No Drawing.   Application filed November 23, 1921. Serial No. 517,198.

*To all whom it may concern:*

Be it known that I, HARRY HOWARD STOUT, a citizen of the United States, residing at Douglas, in the county of Cochise and State of Arizona, have invented certain new and useful Improvements in Treatment of Copper Metallurgical Slag, of which the following is a specification.

This invention relates to a method of treating copper metallurgical slags in order to recover therefrom contained copper. The method involves treating the slag with metallic iron, which replaces the copper constituent of certain of the copper compounds found in the slag, the replaced copper being thereby precipitated and made available for recovery.

One of the incidental objects of my invention is to make possible the recovery of copper from copper metallurgical slags by the use of metallic iron alone as a precipitant, and in such a way that fuel expense is held to a desirable minimum, with substantially complete cleaning of the slag (within commercial limits of course).

Another incidental object is to treat the molten copper slag with metallic iron, and to facilitate the resulting precipitation by agitating the mass under treatment with metallic iron which is, or is maintained, in a substantially unmolten condition.

Other objects and aims of the invention, more or less broad than those stated above, together with the advantages inherent, will be in part obvious and in part specifically referred to in the course of the following description of the elements, combinations, and applications of principles constituting the invention; and the scope of protection contemplated will appear from the claims.

It is familiar practice in this art to accomplish a partial and progressive "cleaning" of copper slags by mixing the same with low grade ore or low grade matte, presupposing that these washing materials are fused when they are mixed with the slag by a fuel fired revolving mechanism, or that they have previously been melted and are poured into the molten slag-containing cleaner in a molten condition. The expense of producing low grade matte according to this method by a separate furnace is so great that it is not commercially practicable and therefore the process is limited commercially to the use of low grade ores, as for instance, pyrite, which is added to the molten slag-containing cleaner and fired by fuel, the cleaner being meanwhile rotated or some other provision being made for agitation and thorough mixing of its contents. In ordinary practice from seven to ten per cent of this low grade washing ore would be added to each ton of the molten slag, and unless the whole mass was fired by fuel during the mixing operation it would go cold and solidify. Furthermore, although it has been proposed to mechanically wash the slag with a series of baths each containing a smaller percentage of copper than the original matte from which the slag was removed, it is evident that even so it would not be possible to remove all of the copper contained in the slag, because after each such treatment the slag would be merely lower in copper content than it was after the preceding treatment.

According to my process I propose to utilize, for the precipitation of the copper from the slag, relatively small quantities of metallic iron, whose melting point is below the temperature of the slag, so that when the iron is added, the temperature of the slag is sufficiently high above its solidifying point so that this small amount of added metallic iron will be melted and fused by the excess of heat in the slag. By predetermining the proportion of metallic iron added to a given charge of the molten slag, having in mind the temperature of the slag, the melting point of the iron and the amount of iron theoretically necessary to make the chemical combinations that will result in precipitation of copper from the slag, it is feasible to recover substantially the maximum of copper from the slag, within commercial limits, and without the necessity for premelting the precipitating material. I believe I am the first to propose a method for substantially completely cleaning a copper slag and recovering its copper content in one operation, and my process is based upon the discovery that a small quantity of metallic iron can be added to the molten slag in such a way that all of the iron is combined with constituents of the slag and each unit of iron replaces a unit of copper in the slag compounds. The total amount of iron necessary for the substantially complete cleaning of a given quantity of slag will of course depend upon conditions, but under ordinary circumstances it is feasible to add metallic iron in the cold to a mass of molten slag, in quantity sufficient to precipitate the maximum of copper, and without necessitating premelting of the iron but accomplishing its melting directly by the excess heat of the slag and without lowering the temperature of the slag below a proper working minimum.

The prior art processes above referred to proceed entirely on the theory that an equilibrium is attained between the copper combined with the constituents of the slag, and that combined with the constituents of the low grade washing ore or matte, depending upon the relative quantities of combined metal in each of these substances. The result is therefore that after any single washing operation the treated slag is found to have a lower copper content; and it has never been even suggested in this prior art practice that all of the copper content (in a commercial sense of course) could be removed as the result of a single treatment involving the precipitating action of iron directly with the slag constituents. The importance of this distinction is in the fact that when large quantities of low grade washing ore are added to molten slag, with incidental firing of the mixture in a revolving cleaner, there are other reactions taking place besides those which involve merely and directly the constituents of the washing material and the constituents of the slag. In other words, the old process is wasteful of material, time, chemical energy and labor, and gives but partial results. By my process I accomplish complete results, with saving of fuel and material, and with no more chemical reactions than what are necessary to combine with the slag constituents the minimum of precipitating material that will result in the precipitation of substantially all of the copper content of the slag. Accordingly, the invention may be said to proceed from the broad proposition that metallic iron acts to precipitate copper and substitutes itself for copper in both the silicate and the matte prill constituents of slag.

The temperature at which slag is formed in a reverberatory furnace is generally from 2250° F. to 2300° F., and the selection of iron is made with reference to the slag temperature. Thus, if I select iron whose fusion or melting temperature is somewhat above the maximum slag temperature—say about 2350° F.—it will be consumed only to the extent that is required for combination with slag constituents and precipitation of copper. Instead of thus selecting iron of high melting point, I may use iron having a lower melting temperature than that of the slag, and prevent the melting thereof as by interior ventilation or by causing radiation of some of the heat of the iron direct to atmosphere.

An iron having a melting point lower than the slag temperature may be employed, and the normal melting thereof permitted to take place within and because of the excess heat of the slag charge, with distribution of the iron throughout the body of the charge, and with resulting precipitation of copper. By my invention I am enabled to completely clean (or substantially so) a charge of slag, by distribution of iron throughout the body of slag and consumption thereof in amount regulated by the requirements of the precipitating reactions. If a low melting point iron alone is used, the only necessity is that its melting point and quantity be such that its fusion within the body of the slag will accomplish the desired precipitation of copper without waste of iron and without lowering the temperature of the slag below a proper working minimum. Where iron is used with melting point higher than the slag temperature, or where the consumption of the iron is regulated in accordance with precipitation, the amount of iron introduced within the slag body must not be so great as to harmfully lower the slag temperature. Of course, in establishing working conditions, consideration must be given to empirically determined data as to slag constituents, slag temperature, practical availability of iron of higher or lower melting point, etc.

The possible additional step of agitating the slag-and-iron mixture by means of metallic iron which has a melting point higher than the slag temperature, or which is maintained in an unmolten condition, enables me to expedite the precipitation of the copper; and I am thus insured against an excess consumption of iron, because I may add the low-melting-point iron in quantity slightly below what would theoretically be necessary and make up the difference by way of the consumption of the agitating iron, which of course would be used up only to the extent that it actually went into combination with slag constituents.

Agitation of the molten slag-and-iron mixture by means of non-molten iron, where deemed necessary, may be accomplished in various ways, as by stirring the mixture with bars of iron or steel which remain non-molten in the mixture.

I claim:

I. The method of precipitating copper from molten copper metallurgical slag, which consists in providing a charge of the molten slag at a definite temperature, adding to the charge a quantity of metallic iron, effecting melting and fusion of the iron by the unincreased heat of the slag charge, and distribution of the iron throughout the body of the charge, so that the iron combines with copper-compound constituents of the slag as such, to replace and precipitate the copper content thereof.

2. The method set forth in claim 1, in which the iron has a melting point sufficiently below the temperature of the slag so that it is melted and fused by the excess of heat in the slag.

3. The method set forth in claim 1, in which the iron has a melting point sufficiently below the temperature of the slag, and is in such quantity that it is melted and fused by the excess of heat in the slag, and so that the slag-and-iron mixture remains molten during the resulting precipitation of copper, and so that the maximum of copper is precipitated.

4. The method set forth in claim 1, in which the slag-and-iron mixture is agitated with iron that remains unmolten during the precipitation.

5. The method set forth in claim 1, in which the slag-and-iron mixture contains less of the iron, added as aforesaid, than is required to cause precipitation of the entire copper content, and in which the mixture is agitated with iron that remains unmolten during the precipitation.

In testimony whereof I affix my signature.

HARRY HOWARD STOUT.